United States Patent
Ye et al.

(10) Patent No.: US 12,393,499 B2
(45) Date of Patent: Aug. 19, 2025

(54) METHOD AND DEVICE FOR RECOVERING SELF-TEST EXCEPTION OF SERVER COMPONENT, SYSTEM AND MEDIUM

(71) Applicant: SUZHOU METABRAIN INTELLIGENT TECHNOLOGY CO., LTD., Jiangsu (CN)

(72) Inventors: Mingyang Ye, Jiangsu (CN); Min Zhang, Jiangsu (CN); Wenyu Liu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/564,699

(22) PCT Filed: Mar. 29, 2022

(86) PCT No.: PCT/CN2022/083574
§ 371 (c)(1),
(2) Date: Nov. 28, 2023

(87) PCT Pub. No.: WO2023/065601
PCT Pub. Date: Apr. 27, 2023

(65) Prior Publication Data
US 2024/0264914 A1    Aug. 8, 2024

(30) Foreign Application Priority Data
Oct. 20, 2021  (CN) .......................... 202111218289.0

(51) Int. Cl.
G06F 11/00   (2006.01)
G06F 11/22   (2006.01)
G06F 11/277  (2006.01)

(52) U.S. Cl.
CPC ........ *G06F 11/2284* (2013.01); *G06F 11/277* (2013.01)

(58) Field of Classification Search
CPC .......................... G06F 11/2284; G06F 11/277
(Continued)

(56) References Cited

U.S. PATENT DOCUMENTS 7,246,266 B2 *  7/2007  Sneed ................. G06F 11/1433
                                                       714/36
2008/0148038 A1 *  6/2008  Abe ...................... G06F 11/167
                                                        713/2

(Continued)

FOREIGN PATENT DOCUMENTS

CN      110908847 A      3/2020
CN      111858119 A     10/2020
(Continued)

OTHER PUBLICATIONS

International Search Report for PCT/CN2022/083574 (Jun. 28, 2022).
(Continued)

*Primary Examiner* — Jason B Bryan
(74) *Attorney, Agent, or Firm* — Merchant & Gould P.C.

(57) ABSTRACT

The present application discloses a method and device for recovering self-test exception of a server component, a system and a medium. The method includes the following steps: acquiring self-test exception state data sent by a platform control center when a target component in a server has a self-test exception; querying corresponding first firmware data and second firmware data from the first flash memory chip and the second flash memory chip based on the self-test exception state data; determining whether the first firmware data is consistent with the second firmware data; and determining target firmware data for self-test exception (Continued)

recovery based on the first firmware data and the second firmware data if the first firmware data is consistent with the second firmware data, and sending the target firmware data to the platform control center, so that the platform control center performs self-test exception recovery by using the target firmware data.

20 Claims, 6 Drawing Sheets

(58) Field of Classification Search
USPC .......................................................... 714/36
See application file for complete search history.

(56) References Cited

U.S. PATENT DOCUMENTS

| | | | |
|---|---|---|---|
| 2010/0281297 | A1 | 11/2010 | Jibbe et al. |
| 2015/0149815 | A1* | 5/2015 | Maity ................ G06F 11/1417 |
| | | | 714/5.11 |
| 2016/0147604 | A1* | 5/2016 | Chiu .................. G06F 11/2284 |
| | | | 714/36 |
| 2024/0012706 | A1* | 1/2024 | Han ................... G06F 11/2284 |

FOREIGN PATENT DOCUMENTS

| | | |
|---|---|---|
| CN | 112667462 A | 4/2021 |
| CN | 113064757 A | 7/2021 |
| CN | 113672306 A | 11/2021 |

OTHER PUBLICATIONS

Search Report for Chinese Patent Application No. 2021112182890 (Nov. 24, 2022).

* cited by examiner

METHOD AND DEVICE FOR RECOVERING SELF-TEST EXCEPTION OF SERVER COMPONENT, SYSTEM AND MEDIUM

CROSS-REFERENCE TO RELATED APPLICATION

The present application is a National Stage Application of PCT International Application No. PCT/CN2022/083574, filed on Mar. 29, 2022, which claims the benefit of priority to Chinese patent application No. 202111218289.0, filed in the China Patent Office on Oct. 20, 2021 and entitled "method and device for recovering self-test exception of server component, system and medium", the entire contents of which are incorporated into the present application by reference. To the extent appropriate, a claim of priority is made to each of the above disclosed applications.

TECHNICAL FIELD

The present application relates to the technical field of computers, and in particular to a method and device for recovering self-test exception of a server component, system and medium.

BACKGROUND

With the development of computer technologies, industrial computers have been applied to many fields of social production, such as industrial control, data acquisition and environmental monitoring. Most of these occasions require a computer system to work stably for a long time. After a server is powered on, an operating system of the server tests internal components by a self-test program to test whether working states of these components are normal, so that the operating system of the server can be started normally. For example, a BIOS (Basis Input Output System) is a set of programs solidified on a server motherboard, and one of its main functions is a POST (POWER ON SELF TEST), which is to test the components of the server system.

In the related art, during a self-test, the firmware is usually loaded from one flash memory chip. When the firmware has an exception, the problem of exception during the self-test is mainly solved by manually switching the flash memory chip or burning the firmware again. However, the above method requires relatively high time cost and labor cost, and the problem may not be prevented from repeatedly occurring later again.

To sum up, how to automatically recover the self-test exception problem that occurs during the startup of the operating system of the server is a problem to be solved in the related art.

SUMMARY

In a first aspect, the embodiments of the present application disclose a method for recovering self-test exception of a server component, applied to a server control chip, including the following steps:
acquiring self-test exception state data sent by a platform control center when a target component in a server has a self-test exception;
querying corresponding first firmware data and second firmware data from a first flash memory chip and a second flash memory chip based on the self-test exception state data;
determining whether the first firmware data is consistent with the second firmware data; and
determining target firmware data for self-test exception recovery based on the first firmware data and the second firmware data if the first firmware data is consistent with the second firmware data, and sending the target firmware data to the platform control center, so that the platform control center performs self-test exception recovery by using the target firmware data.

In some embodiments of the present application, querying corresponding first firmware data and second firmware data from the first flash memory chip and the second flash memory chip based on the self-test exception state data includes:
judging whether the self-test exception state data is wrong;
sending the self-test exception state data to the first flash memory chip and the second flash memory chip if the self-test exception state data is correct, so that the first flash memory chip and the second flash memory chip perform corresponding firmware data query operations by using the self-test exception state data; and
acquiring first firmware data queried by the first flash memory chip and second firmware data queried by the second flash memory chip.

In some embodiments of the present application, judging whether the self-test exception state data is wrong includes:
acquiring preset state data corresponding to the self-test exception state data from a field replaceable unit; and
determining whether the self-test exception state data is wrong by comparing the self-test exception state data with the preset state data.

In some embodiments of the present application, before acquiring preset state data corresponding to the self-test exception state data from the field replaceable unit, the method further includes:
judging whether an operation corresponding to the self-test exception state data is a preset operation by using firmware data locally stored in the server control chip; and
triggering a step of acquiring preset state data corresponding to the self-test exception state data from the field replaceable unit if the operation corresponding to the self-test exception state data is the preset operation.

In some embodiments of the present application, after judging whether the self-test exception state data is wrong, the method further includes:
sending the preset state data in the field replaceable unit to the first flash memory chip and the second flash memory chip if the self-test exception state data is wrong, so that the first flash memory chip and the second flash memory chip perform corresponding firmware data query operations by using the preset state data in the field replaceable unit; and
acquiring first firmware data queried by the first flash memory chip and second firmware data queried by the second flash memory chip.

In some embodiments of the present application, after determining whether the first firmware data is consistent with the second firmware data, the method further includes:
judging whether preset firmware data corresponding to preset state data in a field replaceable unit is consistent with the first firmware data or the second firmware data if the first firmware data is inconsistent with the second firmware data, wherein the preset state data is the preset state data corresponding to the self-test exception state data in the field replaceable unit; and sending firmware data consistent with the preset firmware data in the first firmware data and the second firmware data to the platform control center if the preset firmware data in the field replaceable unit is consistent with the first firmware data or the second firmware data, so that the platform control center performs self-test exception recovery by using the firmware data.

In some embodiments of the present application, after judging whether preset firmware data corresponding to the preset state data in the field replaceable unit is consistent with the first firmware data or the second firmware data, the method further includes:

sending the preset firmware data in the field replaceable unit to the platform control center if the preset firmware data in the field replaceable unit is inconsistent with the first firmware data or the second firmware data, so that the platform control center performs self-test exception recovery by using the preset firmware data.

In a second aspect, the embodiments of the present application disclose a device for recovering self-test exception of a server component, applied to a server control chip, including:

a data acquisition component configured to acquire self-test exception state data sent by a platform control center when a target component in a server has a self-test exception;

a data query component configured to query corresponding first firmware data and second firmware data from a first flash memory chip and a second flash memory chip based on the self-test exception state data;

a data determination component configured to determine whether the first firmware data is consistent with the second firmware data; and a data sending component configured to determine target firmware data for self-test exception recovery based on the first firmware data and the second firmware data if the first firmware data is consistent with the second firmware data, and send the target firmware data to the platform control center, so that the platform control center performs self-test exception recovery by using the target firmware data.

In some embodiments of the present application, the device further includes:

a third judging unit configured to judge whether preset firmware data corresponding to the preset state data in a field replaceable unit is consistent with the first firmware data or the second firmware data if the first firmware data is inconsistent with the second firmware data, wherein the preset state data is the preset state data corresponding to the self-test exception state data in the field replaceable unit; and a second data sending unit configured to send firmware data consistent with the preset firmware data in the first firmware data and the second firmware data to the platform control center if the preset firmware data in the field replaceable unit is consistent with the first firmware data or the second firmware data, so that the platform control center performs self-test exception recovery by using the firmware data.

In a third aspect, the embodiments of the present application disclose a server system, including: a first flash memory chip, a second flash memory chip and a memory for storing computer programs;

the system further comprising a server control chip which is respectively connected with the first flash memory chip, the second flash memory chip and the memory and used for executing the computer programs in the memory to:

acquire self-test exception state data sent by a platform control center when a target component in a server has a self-test exception; query corresponding first firmware data and second firmware data from the first flash memory chip and the second flash memory chip based on the self-test exception state data; determine whether the first firmware data is consistent with the second firmware data; and determine target firmware data for self-test exception recovery based on the first firmware data and the second firmware data if the first firmware data is consistent with the second firmware data, and sending the target firmware data to the platform control center, so that the platform control center performs self-test exception recovery by using the target firmware data.

In some embodiments of the present application, after determining whether the first firmware data is consistent with the second firmware data, the server control chip further configured to:

judge whether preset firmware data corresponding to the preset state data in a field replaceable unit is consistent with the first firmware data or the second firmware data if the first firmware data is inconsistent with the second firmware data, wherein the preset state data is the preset state data corresponding to the self-test exception state data in the field replaceable unit; and send firmware data consistent with the preset firmware data in the first firmware data and the second firmware data to the platform control center if the preset firmware data in the field replaceable unit is consistent with the first firmware data or the second firmware data, so that the platform control center performs self-test exception recovery by using the firmware data.

In a fourth aspect, the embodiments of the present application disclose a non-transitory computer readable storage medium for storing computer programs, where the computer programs, when executed by a processor, cause the processor to perform the method for recovering sever component self-test exception disclosed above.

BRIEF DESCRIPTION OF THE DRAWINGS

In order to more clearly explain the embodiment of this application or the technical solutions in the prior art, the drawings needed in the description of the embodiment or the prior art will be briefly introduced as follows. Obviously, the drawings in the following description are only embodiments of the present application, and those skilled in the art may obtain other drawings according to the provided drawings without any creative work.

DETAILED DESCRIPTION OF THE EMBODIMENTS

The technical solutions in the embodiments of the application will be described below clearly and completely with reference to the drawings in the embodiments of the application. Obviously, the described embodiments are only some of the embodiments of the application, and not all of the embodiments. All other embodiments obtained by a person of ordinary skill in the art based on the embodiments of this application without creative efforts shall fall within the protection scope of this application.

In the related art, after a server is powered on, an operating system of the server tests internal components by a self-test program to test whether working states of these components are normal, so that the operating system of the server may be started normally. During a self-test, the firmware is usually loaded from one flash memory chip. When the firmware has an exception, the problem of exception during the self-test is mainly solved by manually switching the flash memory chip or burning the firmware again. However, the above method requires relatively high time cost and labor cost, and the problem may not be prevented from repeatedly occurring later again. Therefore, an embodiment of the present application discloses a method for recovering self-test exception of a server component, which may automatically recover a self-test exception that occurs during the startup of an operating system of a server.

Figure 1:
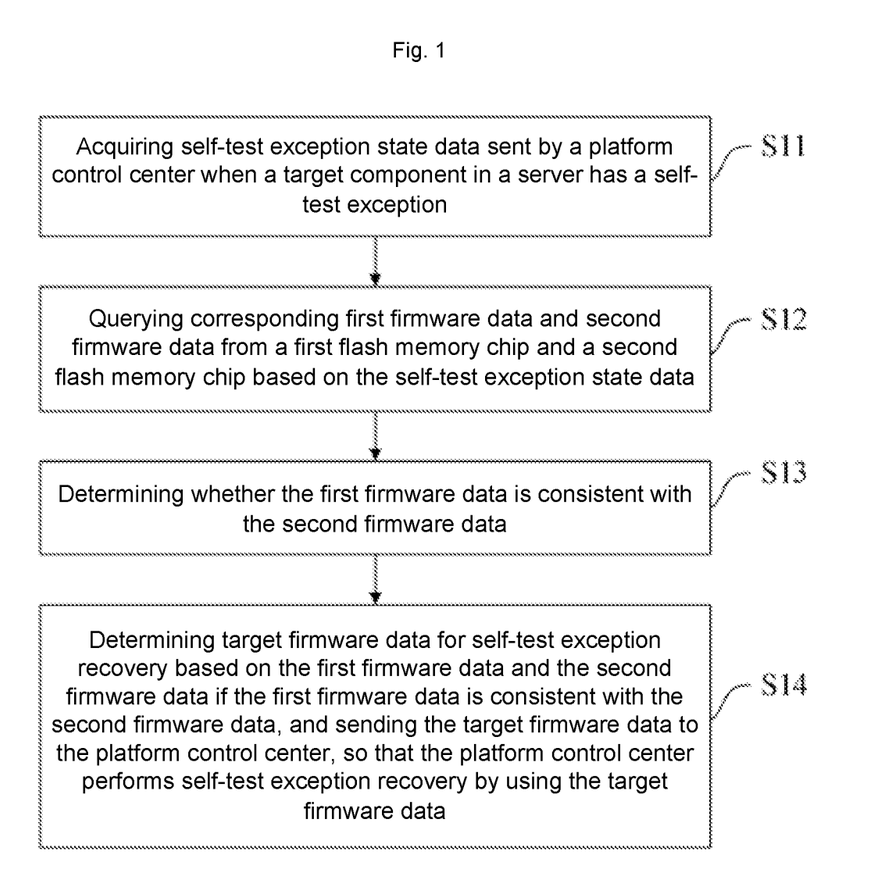
FIG. 1 is a flowchart of a method for recovering self-test exception of a server component disclosed in the embodiments of the present application.

Referring to FIG. 1, an embodiment of the present application discloses a method for recovering self-test exception of a server component, which is applied to server control chips, for example, a complex programmable logic device, a FPGA (Field-Programmable Gate Array), a PLA (Programmable Logic Array), a DSP (Digital Signal Processor). The method includes the following steps:

Step S11: acquiring self-test exception state data sent by a platform control center when a target component in a server has a self-test exception.

In some embodiments of the present application, when the target component in the server has a self-test exception during a power-on self-test, the self-test exception state data sent by the platform control center is acquired.

Step S12: querying corresponding first firmware data and second firmware data from a first flash memory chip and a second flash memory chip based on the self-test exception state data.

In some embodiments of the present application, after the self-test exception state data is acquired, it is necessary to query corresponding first firmware data and second firmware data for self-test exception recovery from the first flash memory chip and the second flash memory chip connected with the server control chip in advance based on the self-test exception state data.

Step S13: determining whether the first firmware data is consistent with the second firmware data.

In some embodiments of the present application, it is necessary to compare the first firmware data and the second firmware data queried above, and judge whether the first firmware data is consistent with the second firmware data based on a comparison result.

Step S14: determining target firmware data for self-test exception recovery based on the first firmware data and the second firmware data if the first firmware data is consistent with the second firmware data, and sending the target firmware data to the platform control center, so that the platform control center performs self-test exception recovery by using the target firmware data.

In some embodiments of the present application, when the comparison result is that the first firmware data is consistent with the second firmware data, an AND operation is performed on the first firmware data and the second firmware data, the target firmware data for self-test exception recovery is obtained based on an operation result, and then the target firmware data is sent to the platform control center, so that the platform control center performs the self-test exception recovery by using the target firmware data.

Figure 2:
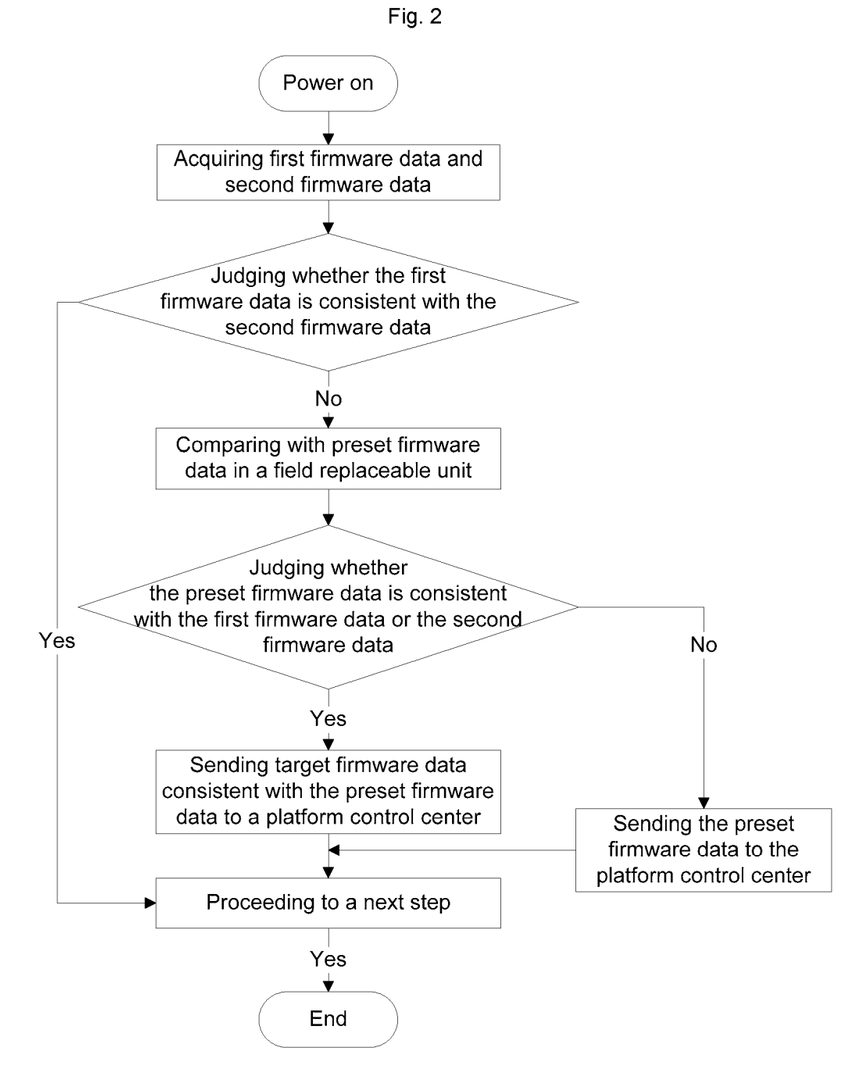
FIG. 2 is a flowchart for determining target firmware data disclosed in the embodiments of the present application.

As shown in FIG. 2, in another embodiment of the present application, if the first firmware data is inconsistent with the second firmware data, it is judged whether the preset firmware data corresponding to the preset state data in the field replaceable unit is consistent with the first firmware data or the second firmware data; and the firmware data consistent with the preset firmware data in the first firmware data and the second firmware data are sent to the platform control center if the preset firmware data in the field replaceable unit is consistent with the first firmware data or the second firmware data, so that the platform control center performs self-test exception recovery by using the firmware data. It is to be noted that in some embodiments of the present application, the preset state data refers to the data corresponding to the self-test exception state data when the target component is in a normal state, and the preset firmware data is correct firmware data that should be returned based on the preset state data. Therefore, when the first firmware data and the second firmware data are inconsistent, it means that an exception occurs when the first flash memory chip or the second flash memory chip loads the firmware, so it is necessary to judge whether correct target firmware data consistent with the first firmware data or the second firmware data may be found from the preset firmware data corresponding to the preset state data in the field replaceable unit, and if the preset firmware data in the field replaceable unit is consistent with the first firmware data or the second firmware data, the firmware data which is consistent with the preset firmware data in the first firmware data and the second firmware data is taken as target firmware data and sent the target firmware data to the platform control center, so that the platform control center performs self-test exception recovery by using the target firmware data, and at the same time, it also shows that one of the first flash memory chips or the second flash memory chips has an exception when loading firmware.

Further, after judging whether the preset firmware data corresponding to the preset state data in the field replaceable unit is consistent with the first firmware data or the second firmware data, the method further includes: sending the preset firmware data in the field replaceable unit to the platform control center if the preset firmware data in the field replaceable unit is inconsistent with the first firmware data or the second firmware data, so that the platform control center performs self-test exception recovery by using the preset firmware data. It may be understood that if the preset firmware data in the field replaceable unit is inconsistent with the first firmware data and the second firmware data, it means that both the first flash memory chip and the second flash memory chip have exception when loading firmware, and at this time, it is necessary to take the preset firmware data corresponding to the preset state data in the field replaceable unit as the target firmware data and send it to the platform control center, so that the platform control center performs self-test exception recovery by using the target firmware data described above.

It may be seen that the present application provides a method for recovering self-test exception of a server component applied to a server control chip, including the following steps: firstly, acquiring self-test exception state data sent by a platform control center when a target component in a server has a self-test exception; querying corresponding first firmware data and second firmware data from the first flash memory chip and the second flash memory chip based on the self-test exception state data; then determining whether the first firmware data is consistent with the second firmware data; and determining target firmware data for self-test exception recovery based on the first firmware data and the second firmware data if the first firmware data is consistent with the second firmware data, and sending the target firmware data to the platform control center, so that the platform control center performs the self-test exception recovery by using the target firmware data. It thus may be seen that according to the present application, the first firmware data and the second firmware data are queried from two flash memory chips connected with the server control chip based on the self-test exception state data sent by the platform control center, and the target firmware data for self-test exception recovery is determined based on the first firmware data and the second firmware data; by using the mode adopting two flash memory chips, a success rate of component self-test exception recovery is increased, so that the labor cost caused by manual intervention operations such as replacement of flash memory chips is reduced, and the effect of automatic recovery by using the target firmware data is realized when the self-test exception occurs after the server is powered on, facilitating quick and normal startup of the operating system of the server.

Figure 3:
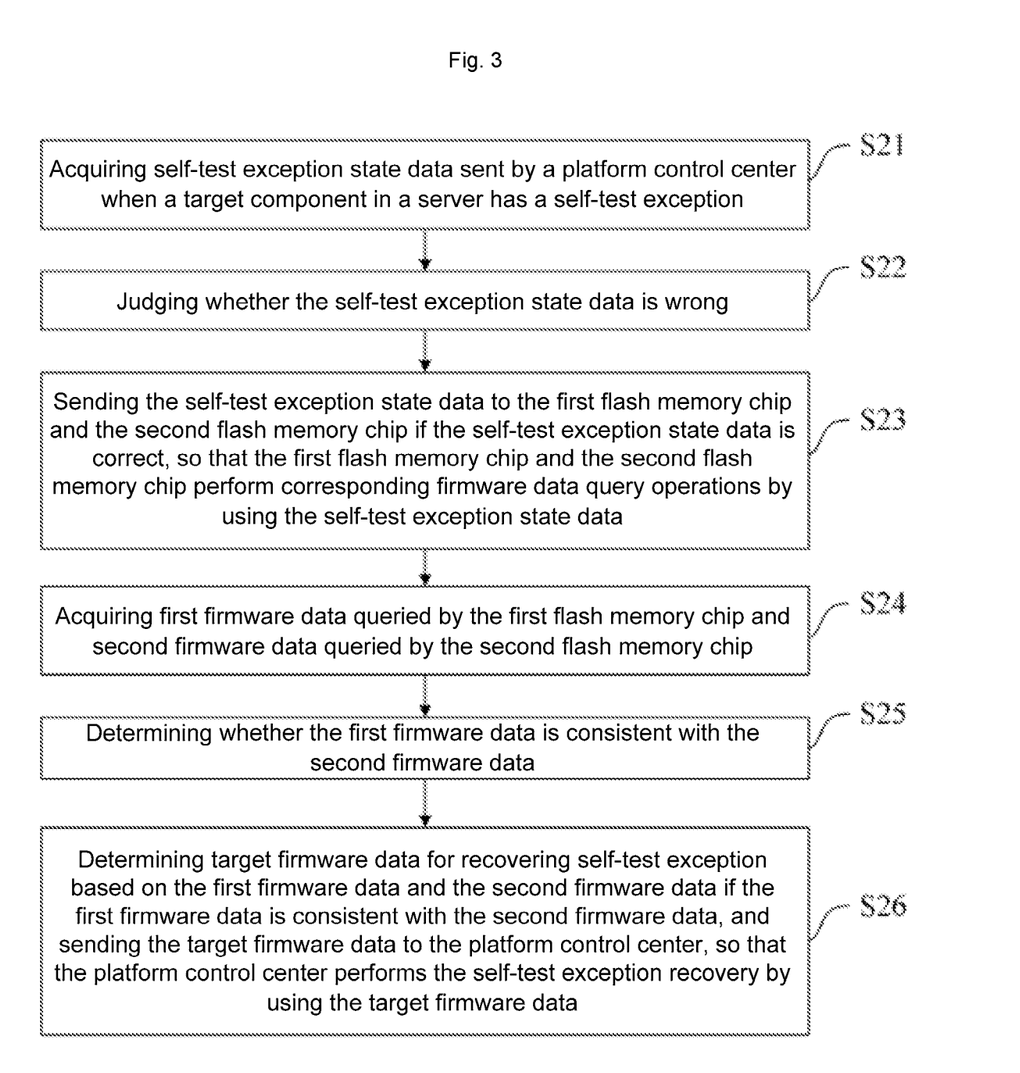
FIG. 3 is a flowchart of a specific method for recovering self-test exception of a server component disclosed in the embodiments of the present application.

As shown in FIG. 3, an embodiment of the present application discloses a method for recovering self-test exception of a server component, applied to a server control chip. Compared with the previous embodiment, this embodiment further explains and optimizes the technical solution, including:

Step S21: acquiring self-test exception state data sent by a platform control center when a target component in a server has a self-test exception.

Step S22: judging whether the self-test exception state data is wrong.

In some embodiments of the present application, the judging whether the self-test exception state data is wrong may include: acquiring preset state data corresponding to the self-test exception state data from a field replaceable unit; and determining whether the self-test exception state data is wrong by comparing the self-test exception state data with the preset state data. It may be understood that in the field replaceable unit, the preset state data corresponding to the self-test exception state data described above is recorded, and the preset state data is the data that the target component is in a normal state, so that whether the self-test exception state data described above is wrong may be judged based on the comparison result of comparing the self-test exception state data with the preset state data.

Figure 4:
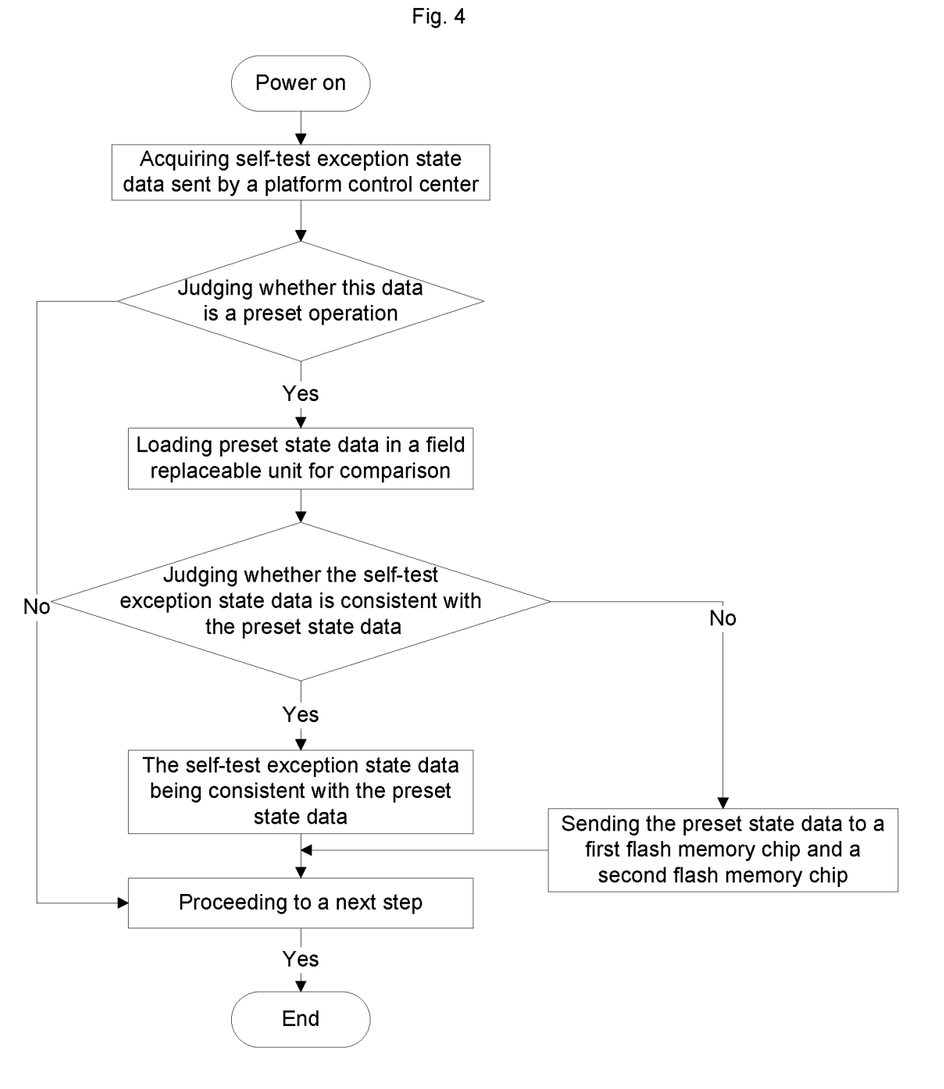
FIG. 4 is a flowchart for judging a preset operation disclosed in the embodiments of the present application.

Further, as shown in FIG. 4, in some embodiments of the present application, before acquiring the preset state data corresponding to the self-test exception state data from the field replaceable unit, the method further includes: judging whether an operation corresponding to the self-test exception state data is a preset operation by using firmware data locally stored in the server control chip; and triggering the step of acquiring preset state data corresponding to the self-test exception state data from a field replaceable unit if the operation corresponding to the self-test exception state data is the preset operation. It is to be noted that before acquiring the preset state data corresponding to the self-test exception state data from the field replaceable unit, it is also necessary to judge whether the self-test exception state data is a preset operation by using use the server control chip according to the locally saved firmware data, where the locally saved firmware data is obtained based on the data sent by the platform control center, and the preset operation mainly refers to whether operation information corresponding to the state data is information for characterizing key operations, such as a command loaded by a key driver, a return value corresponding to an key driver loading operation. It may be understood that the subsequent step of acquiring the preset state data corresponding to the self-test exception state data from the field replaceable unit will be triggered only when the operation corresponding to the self-test exception state data is a key operation, that is, if the operation corresponding to the self-test exception state data is not a key operation, the subsequent step of acquiring the preset state data corresponding to the self-test exception state data from the field replaceable unit will not be performed.

S23: sending the self-test exception state data to the first flash memory chip and the second flash memory chip if the self-test exception state data is correct, so that the first flash memory chip and the second flash memory chip perform corresponding firmware data query operation by using the self-test exception state data.

In some embodiments of the present application, when the self-test exception state data is consistent with the preset state data, it may be determined that the self-test exception state data is correct, then the self-test exception state data is directly sent to the first flash memory chip and the second flash memory chip which are connected with the server control chip in advance, and the corresponding firmware data query operation is performed by using the self-test exception state data through the first flash memory chip and the second flash memory chip.

In another embodiment of the present application, the preset state data in the field replaceable unit is sent to the first flash memory chip and the second flash memory chip if the self-test exception state data is wrong, so that the first flash memory chip and the second flash memory chip perform corresponding firmware data query operations by using the preset state data in the field replaceable unit. It may be understand that, when the self-test exception state data is inconsistent with the preset state data, it may be determined that the self-test exception state data is wrong, then the preset state data corresponding to the self-test exception state data in the field replaceable unit, that is, the data that the target component is in a normal state, is sent to the first flash memory chip and the second flash memory chip, and corresponding firmware data query operations are performed by using the preset state data through the first flash memory chip and the second flash memory chip.

Step S24: acquiring first firmware data queried by the first flash memory chip and second firmware data queried by the second flash memory chip.

In some embodiments of the present application, after the first flash memory chip and the second flash memory chip perform corresponding firmware data query operations by using the self-test exception state data, the first firmware data queried by the first flash memory chip and the second firmware data queried by the second flash memory chip are acquired.

Step S25: determining whether the first firmware data is consistent with the second firmware data.

Step S26: determining target firmware data for self-test exception recovery based on the first firmware data and the second firmware data if the first firmware data is consistent with the second firmware data, and sending the target firmware data to the platform control center, so that the platform control center performs the self-test exception recovery by using the target firmware data.

Reference may be made to the corresponding contents disclosed in the above embodiments for more processing procedures of the above steps S21, S25 and S26, which will be omitted here.

It thus may be seen that in a process of querying the corresponding first firmware data and second firmware data from the first flash memory chip and the second flash memory chip based on the self-test exception state data, it is necessary to use the firmware data stored locally by the server control chip to judge whether the operation corresponding to the self-test exception state data is the preset operation; only after the self-test exception state data is the preset operation, it is also necessary to compare the self-test exception state data with the preset state data recorded in the field replaceable unit for characterizing that the target component is in the normal state; and when the self-test exception state data is consistent with the preset state data, it may be determined that the self-test exception state data is correct, and the self-test exception state data is sent to the first flash memory chip and the second flash memory chip, so that the first flash memory chip and the second flash memory chip perform corresponding firmware data query operations by using the self-test exception state data. It thus may be seen that only the self-test exception state data which is used to characterize key operations and is correct is processed in some embodiments of the present application; in this way, the automatic exception recovery of components for non-key operations is avoided, so that the time cost is reduced, and the efficiency in the self-test exception recovery process is improved.

Figure 5:
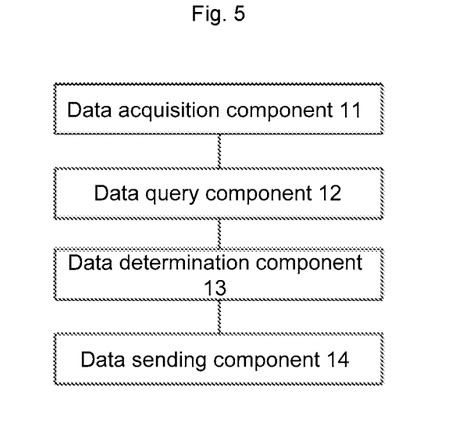
FIG. 5 is a schematic structural diagram of a device for recovering self-test exception of a server component disclosed in the embodiments of the present application.

As shown in FIG. 5, an embodiment of the present application discloses a device for recovering self-test exception of a server component, applied to a server control chip, the device including:
  a data acquisition component 11 configured to acquire self-test exception state data sent by a platform control center when a target component in a server has a self-test exception;
  a data query component 12 configured to query corresponding first firmware data and second firmware data from a first flash memory chip and a second flash memory chip based on the self-test exception state data;
  a data determination component 13 configured to determine whether the first firmware data is consistent with the second firmware data; and
  a data sending component 14 configured to determine target firmware data for self-test exception recovery based on the first firmware data and the second firmware data if the first firmware data is consistent with the second firmware data, and send the target firmware data to the platform control center, so that the platform control center performs self-test exception recovery by using the target firmware data.

It may be seen that the present application provides a method for recovering self-test exception of a server component applied to a server control chip, including the following steps: firstly, acquiring self-test exception state data sent by a platform control center when a target component in a server has a self-test exception; querying corresponding first firmware data and second firmware data from the first flash memory chip and the second flash memory chip based on the self-test exception state data; then determining whether the first firmware data is consistent with the second firmware data; and determining target firmware data for self-test exception recovery based on the first firmware data and the second firmware data if the first firmware data is consistent with the second firmware data, and sending the target firmware data to the platform control center, so that the platform control center performs self-test exception recovery by using the target firmware data. It thus may be seen that according to the present application, the first firmware data and the second firmware data are queried from two flash memory chips connected with the server control chip based on the self-test exception state data sent by the platform control center, and the target firmware data for self-test exception recovery is determined based on the first firmware data and the second firmware data; by using the mode adopting two flash memory chips, a success rate of component self-test exception recovery is increased, so that the labor cost caused by manual intervention operations such as replacement of flash memory chips is reduced, and the effect of automatic recovery by using the target firmware data is realized when the self-test exception occurs after the server is powered on, facilitating quick and normal startup of the operating system of the server.

In some specific embodiments of the present application, the data query component 12 further includes:
  a first judging unit configured to judge whether the self-test exception state data is wrong;
  a first query unit configured to send the self-test exception state data to the first flash memory chip and the second flash memory chip if the self-test exception state data is correct, so that the first flash memory chip and the second flash memory chip perform corresponding firmware data query operations by using the self-test exception state data;
  a first data acquisition unit configured to acquire first firmware data queried by the first flash memory chip and second firmware data queried by the second flash memory chip.

In some embodiments of the present application, the first judging unit may include:
  a second data acquisition unit configured to acquire preset state data corresponding to the self-test exception state data from a field replaceable unit; and
  a data comparison unit configured to determine whether the self-test exception state data is wrong by comparing the self-test exception state data with the preset state data.

In some embodiments of the present application, the device for recovering self-test exception of the server component may further include:
  a second judging unit configured to judge whether an operation corresponding to the self-test exception state data is a preset operation by using firmware data locally stored in the server control chip; and
  a step triggering component configured to trigger a step of acquiring preset state data corresponding to the self-test exception state data from the field replaceable unit if the operation corresponding to the self-test exception state data is the preset operation.

In some embodiments of the present application, the device for recovering self-test exception of the server component further includes:

a first data sending unit configured to send the preset state data in the field replaceable unit to the first flash memory chip and the second flash memory chip if the self-test exception state data is wrong, so that the first flash memory chip and the second flash memory chip perform corresponding firmware data query operations by using the preset state data in the field replaceable unit; and a third data acquisition unit configured to acquire first firmware data queried by the first flash memory chip and second firmware data queried by the second flash memory chip.

In some embodiments of the present application, followed by the data comparison component 13, the device for recovering self-test exception of the server component may further include:

a third judging unit configured to judge whether preset firmware data corresponding to the preset state data in a field replaceable unit is consistent with the first firmware data or the second firmware data if the first firmware data is inconsistent with the second firmware data;

a second data sending unit configured to send firmware data consistent with the preset firmware data in the first firmware data and the second firmware data to the platform control center if the preset firmware data in the field replaceable unit is consistent with the first firmware data or the second firmware data, so that the platform control center performs self-test exception recovery by using the firmware data.

In some embodiments of the present application, the device for recovering self-test exception of the server component further includes:

a third data sending unit configured to send the preset firmware data in the field replaceable unit to the platform control center if the preset firmware data in the field replaceable unit is inconsistent with the first firmware data or the second firmware data, so that the platform control center performs self-test exception recovery by using the preset firmware data.

Figure 6:
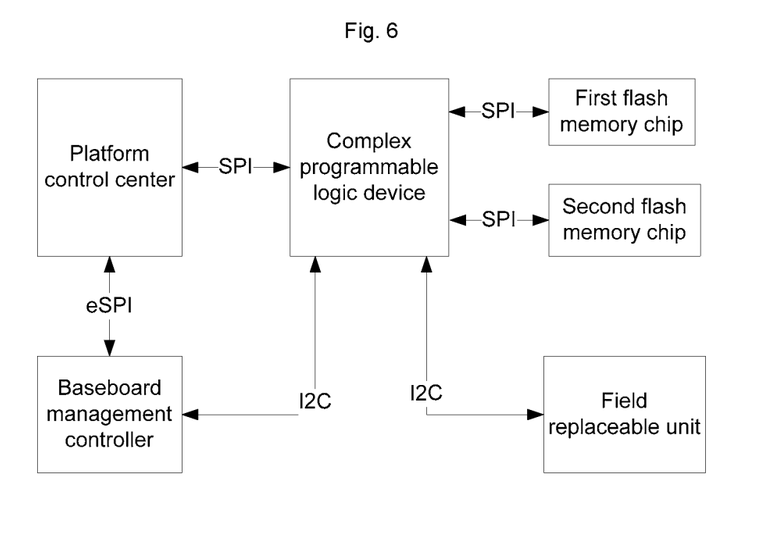
FIG. 6 is a schematic structural diagram of a server system disclosed in the embodiments of the present application.
Figure 7:
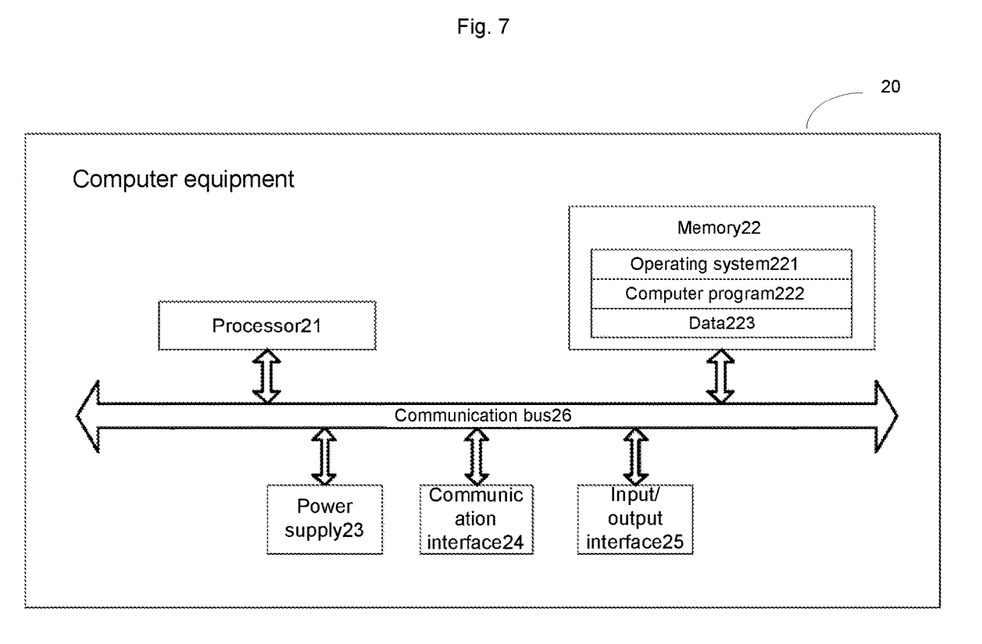
FIG. 7 is a structural diagram of computer equipment disclosed in the embodiments of the present application.

FIGS. 6 and 7 are schematic structural diagrams of a server system and computer equipment provided by an example of the present application.

The server system includes a server control chip (such as the complex programmable logic device shown in FIG. 6), a platform control center, a first flash memory chip and a second flash memory chip which are connected with the server control chip through an SPI (Serial Peripheral interface) link, as well as a field replaceable unit and a baseboard management controller which are connected with the server control chip through an I2C (Inter-Integrated Circuit) link. The baseboard management controller is configured to record related information disclosed in any of the aforementioned embodiments, so that engineers may record and check related problems based on the related information.

The computer equipment may include at least one processor 21, at least one memory 22, a power supply 23, a communication interface 24, an input/output interface 25 and a communication bus 26. The memory 22 is configured to store a computer program, which computer program is loaded and executed by the processor 21 to implement the relevant steps in the method for recovering self-test exception of the server component executed by the computer equipment disclosed in any of the aforementioned embodiments.

In some embodiments of the present application, the power supply 23 is configured to provide working voltage for hardware equipment on the computer equipment 20; the communication interface 24 may create a data transmission channel between the computer equipment 20 and external equipment, following a communication protocol which is any communication protocol capable of being applied to the technical solution of the present application and is not limited here; the input/output interface 25 is configured to acquire external input data or output data to the outside, and its interface type may be selected according to application needs, and is not limited here.

The processor 21 may include one or more processing cores, such as a 4-core processor and an 8-core processor. The processor 21 may be implemented in at least one hardware form of DSP (Digital Signal Processor), FPGA (Field-Programmable Gate Array) and PLA (Programmable Logic Array). The processor 21 may also include a main processor and a co-processor, where the main processor is a processor for processing data in an awaken state, also called CPU (Central Processing Unit) and the co-processor is a low-power processor for processing data in a standby state. In some embodiments of the present application, the processor 21 may be integrated with a graphics processing unit (GPU), and the GPU is used for rendering and drawing contents to be displayed on a display screen. In some embodiments of the present application, the processor 21 may further include an AI (Artificial Intelligence) processor, and the AI processor is used for processing computing operations related to machine learning.

In addition, the memory 22, as a carrier for storing resources, may be a read-only memory, a random access memory, a magnetic disk or an optical disk, etc.; resources stored on the memory include an operating system 221, a computer program 222 and data 223, etc.; and a storage mode may be temporary storage or permanent storage.

The operating system 221 is configured to manage and control various hardware equipment and computer programs 222 on the computer equipment 20 so as to implement operation and processing of massive data 223 in the memory 22 by the processor 21, which may be Windows, Unix, Linux, etc. In addition to the computer program that may be used to complete the method for recovering self-test exception of the server component by the computer equipment 20 disclosed in any of the aforementioned embodiments, the computer program 222 may further include a computer program that may be used to complete other tasks. The data 223 may include data received by computer equipment and transmitted by external equipment, and also data collected by the input/output interface 25 of the computer equipment itself.

Further, an embodiment of the present application also discloses a storage medium having stored a computer program therein, the computer program, when loaded and executed by a processor, implementing method steps performed in the process of self-test exception of the server component disclosed in any of the previous embodiments.

Finally, it also to be noted that the relationship terms, such as "first" and "second", are used herein only for distinguishing one entity or operation from another entity or operation but do not necessarily require or imply that there exists any such actual relationship or sequence between these entities or operations. Also, the terms "comprises," "includes," or any other variation thereof, are intended to cover a nonexclusive inclusion, such that a process, method, article, or apparatus that comprises a list of elements does not include only those elements but may include other elements not expressly listed or inherent to such process, method, article, or apparatus. Without further limitation, an element defined by the phrase "comprising an . . . " does not exclude the presence of other identical elements in the process, method, article, or apparatus that comprises the element.

The method and device for recovering self-test exception of the server component, the system and the storage medium provided by the present application are described in detail, the principle and implementation of the present application are illustrated herein by using examples, and the description of the above embodiments is only used to help understand the method and its core idea of the present application. Meanwhile, according to the idea of the present application, there will be changes in the specific implementation and application scope for ordinary technicians in the art. To sum up, the contents of this description should not be understood as limitations to the present application.

The invention claimed is:

1. A method for recovering self-test exception of a server component, applied to a server control chip, comprising:
   acquiring self-test exception state data sent by a platform control center in response to that a target component in a server has a self-test exception;
   querying first firmware data from a first flash memory chip and querying second firmware data from a second flash memory chip based on the self-test exception state data;
   determining whether the first firmware data is consistent with the second firmware data; and
   in response to the determination that the first firmware data is consistent with the second firmware data, determining target firmware data for self-test exception recovery based on the first firmware data and the second firmware data, and sending the target firmware data to the platform control center, so that the platform control center performs self-test exception recovery by using the target firmware data.

2. The method for recovering self-test exception of the server component as claimed in claim 1, wherein querying the first firmware data from the first flash memory chip and querying the second firmware data from the second flash memory chip based on the self-test exception state data comprises:
   judging whether the self-test exception state data is wrong;
   sending the self-test exception state data to the first flash memory chip and the second flash memory chip in response to that the self-test exception state data is correct, so that the first flash memory chip and the second flash memory chip perform corresponding firmware data query operations by using the self-test exception state data; and
   acquiring first firmware data queried by the first flash memory chip and second firmware data queried by the second flash memory chip.

3. The method for recovering self-test exception of the server component as claimed in claim 2, wherein judging whether the self-test exception state data is wrong comprises:
   acquiring preset state data corresponding to the self-test exception state data from a field replaceable unit; and
   determining whether the self-test exception state data is wrong by comparing the self-test exception state data with the preset state data.

4. The method for recovering self-test exception of the server component as claimed in claim 3, wherein acquiring preset state data corresponding to the self-test exception state data from the field replaceable unit comprises:
   judging whether an operation corresponding to the self-test exception state data is a preset operation by using firmware data locally stored in the server control chip; and
   triggering a step of acquiring preset state data corresponding to the self-test exception state data from the field replaceable unit in response to that the operation corresponding to the self-test exception state data is the preset operation.

5. The method for recovering self-test exception of the server component as claimed in claim 3, wherein after judging whether the self-test exception state data is wrong, the method further comprises:
   sending the preset state data in the field replaceable unit to the first flash memory chip and the second flash memory chip in response to that the self-test exception state data is wrong, so that the first flash memory chip and the second flash memory chip perform corresponding firmware data query operations by using the preset state data in the field replaceable unit; and
   acquiring first firmware data queried by the first flash memory chip and second firmware data queried by the second flash memory chip.

6. The method for recovering self-test exception of the server component as claimed in claim 1, wherein after determining whether the first firmware data is consistent with the second firmware data, the method further comprises:
   judging whether preset firmware data corresponding to preset state data in a field replaceable unit is consistent with the first firmware data or the second firmware data in response to that the first firmware data is inconsistent with the second firmware data, wherein the preset state data is preset state data corresponding to the self-test exception state data in the field replaceable unit; and
   sending firmware data that is consistent with the preset firmware data among the first firmware data and the second firmware data to the platform control center in response to that the preset firmware data in the field replaceable unit is consistent with the first firmware data or the second firmware data, so that the platform control center performs self-test exception recovery by using the firmware data that is consistent with the preset firmware data among the first firmware data and the second firmware data.

7. The method for recovering self-test exception of the server component as claimed in claim 6, wherein after judging whether preset firmware data corresponding to the preset state data in the field replaceable unit is consistent with the first firmware data or the second firmware data, the method further comprises:
   sending the preset firmware data in the field replaceable unit to the platform control center in response to that the preset firmware data in the field replaceable unit is inconsistent with the first firmware data or the second firmware data, so that the platform control center performs self-test exception recovery by using the preset firmware data.

8. The method for recovering self-test exception of the server component as claimed in claim 1, wherein determining target firmware data for self-test exception recovery based on the first firmware data and the second firmware data comprises:

performing an AND operation on the first firmware data and the second firmware data to obtain an operation result;

obtaining the target firmware data for recovering self-test exception based on the operation result.

9. A server system, comprising:

a first flash memory chip, a second flash memory chip and a memory for storing computer programs;

the system further comprising a server control chip which is respectively connected with the first flash memory chip, the second flash memory chip and the memory and used for executing the computer programs in the memory to:

acquire self-test exception state data sent by a platform control center in response to that a target component in a server has a self-test exception; query first firmware data from the first flash memory chip and query second firmware data from the second flash memory chip based on the self-test exception state data; determine whether the first firmware data is consistent with the second firmware data; and in response to the determination that the first firmware data is consistent with the second firmware data, determine target firmware data for self-test exception recovery based on the first firmware data and the second firmware data, and send the target firmware data to the platform control center, so that the platform control center performs self-test exception recovery by using the target firmware data.

10. The server system as claimed in claim 9, after determining whether the first firmware data is consistent with the second firmware data, the server control chip further configured to:

judge whether preset firmware data corresponding to preset state data in a field replaceable unit is consistent with the first firmware data or the second firmware data in response to that the first firmware data is inconsistent with the second firmware data, wherein the preset state data is preset state data corresponding to the self-test exception state data in the field replaceable unit; and send firmware data that is consistent with the preset firmware data among the first firmware data and the second firmware data to the platform control center in response to that the preset firmware data in the field replaceable unit is consistent with the first firmware data or the second firmware data, so that the platform control center performs self-test exception recovery by using the firmware data that is consistent with the preset firmware data among the first firmware data and the second firmware data.

11. The server system as claimed in claim 9, the server control chip further configured to:

judge whether the self-test exception state data is wrong;

send the self-test exception state data to the first flash memory chip and the second flash memory chip in response to that the self-test exception state data is correct, so that the first flash memory chip and the second flash memory chip perform corresponding firmware data query operations by using the self-test exception state data; and acquire first firmware data queried by the first flash memory chip and second firmware data queried by the second flash memory chip.

12. The server system as claimed in claim 11, the server control chip further configured to:

acquire preset state data corresponding to the self-test exception state data from a field replaceable unit; and determine whether the self-test exception state data is wrong by comparing the self-test exception state data with the preset state data.

13. The server system as claimed in claim 12, the server control chip further configured to:

judge whether an operation corresponding to the self-test exception state data is a preset operation by using firmware data locally stored in the server control chip; and trigger a step of acquiring preset state data corresponding to the self-test exception state data from the field replaceable unit in response to that the operation corresponding to the self-test exception state data is the preset operation.

14. The server system as claimed in claim 12, wherein after judging whether the self-test exception state data is wrong, the server control chip further configured to:

send the preset state data in the field replaceable unit to the first flash memory chip and the second flash memory chip in response to that the self-test exception state data is wrong, so that the first flash memory chip and the second flash memory chip perform corresponding firmware data query operations by using the preset state data in the field replaceable unit; and acquire first firmware data queried by the first flash memory chip and second firmware data queried by the second flash memory chip.

15. The server system as claimed in claim 10, wherein after judging whether preset firmware data corresponding to the preset state data in the field replaceable unit is consistent with the first firmware data or the second firmware data, the server control chip further configured to:

send the preset firmware data in the field replaceable unit to the platform control center in response to that the preset firmware data in the field replaceable unit is inconsistent with the first firmware data or the second firmware data, so that the platform control center performs self-test exception recovery by using the preset firmware data.

16. A non-transitory computer readable storage medium for storing computer programs, wherein the computer programs, when executed by a processor, cause the processor to:

acquire self-test exception state data sent by a platform control center in response to that a target component in a server has a self-test exception;

query first firmware data from a first flash memory chip and query second firmware data from a second flash memory chip based on the self-test exception state data;

determine whether the first firmware data is consistent with the second firmware data; and in response to the determination that the first firmware data is consistent with the second firmware data, determine target firmware data for self-test exception recovery based on the first firmware data and the second firmware data, and send the target firmware data to the platform control center, so that the platform control center performs self-test exception recovery by using the target firmware data.

17. The non-transitory computer readable storage medium as claimed in claim 16, the processor is further configured to:

judge whether the self-test exception state data is wrong;

send the self-test exception state data to the first flash memory chip and the second flash memory chip in response to that the self-test exception state data is correct, so that the first flash memory chip and the second flash memory chip perform corresponding firmware data query operations by using the self-test exception state data; and acquire first firmware data queried by the first flash memory chip and second firmware data queried by the second flash memory chip.

18. The non-transitory computer readable storage medium as claimed in claim 17, the processor is further configured to:

acquire preset state data corresponding to the self-test exception state data from a field replaceable unit; and determine whether the self-test exception state data is wrong by comparing the self-test exception state data with the preset state data.

19. The non-transitory computer readable storage medium as claimed in claim 18, the processor is further configured to:

judge whether an operation corresponding to the self-test exception state data is a preset operation by using firmware data locally stored in the server control chip; and trigger a step of acquiring preset state data corresponding to the self-test exception state data from the field replaceable unit in response to that the operation corresponding to the self-test exception state data is the preset operation.

20. The non-transitory computer readable storage medium as claimed in claim 18, the processor is further configured to:

send the preset state data in the field replaceable unit to the first flash memory chip and the second flash memory chip in response to that the self-test exception state data is wrong, so that the first flash memory chip and the second flash memory chip perform corresponding firmware data query operations by using the preset state data in the field replaceable unit; and acquire first firmware data queried by the first flash memory chip and second firmware data queried by the second flash memory chip.

* * * * *